United States Patent
Wong et al.

(10) Patent No.: US 11,096,150 B2
(45) Date of Patent: Aug. 17, 2021

(54) WIRELESS TELECOMMUNICATIONS APPARATUS AND METHODS

(71) Applicant: Convida Wireless, LLC, Wilmington, DE (US)

(72) Inventors: Shin Horng Wong, Basingstoke (GB); Martin Warwick Beale, Basingstoke (GB); Vivek Sharma, Basingstoke (GB); Brian Alexander Martin, Basingstoke (GB)

(73) Assignee: Covida Wireless, LLC, Wilmington, DE (US)

( * ) Notice: Subject to any disclaimer, the term of this patent is extended or adjusted under 35 U.S.C. 154(b) by 147 days.

(21) Appl. No.: 16/495,107

(22) PCT Filed: Mar. 20, 2018

(86) PCT No.: PCT/EP2018/057080
§ 371 (c)(1),
(2) Date: Sep. 18, 2019

(87) PCT Pub. No.: WO2018/172383
PCT Pub. Date: Sep. 27, 2018

(65) Prior Publication Data
US 2021/0195557 A1    Jun. 24, 2021

(30) Foreign Application Priority Data
Mar. 22, 2017 (EP) .................................... 17162411

(51) Int. Cl.
*H04W 72/02* (2009.01)
*H04W 72/04* (2009.01)
*H04W 36/00* (2009.01)

(52) U.S. Cl.
CPC ....... *H04W 72/02* (2013.01); *H04W 36/0016* (2013.01); *H04W 72/0413* (2013.01); *H04W 72/044* (2013.01)

(58) Field of Classification Search
CPC ........... H04W 74/004; H04W 74/0833; H04W 36/18; H04W 16/14; H04W 24/02;
(Continued)

(56) References Cited

U.S. PATENT DOCUMENTS 6,414,947 B1 * 7/2002 Legg ....................... H04J 13/16
370/331
10,326,573 B2 * 6/2019 Yuan ..................... H04L 5/0091
(Continued)

FOREIGN PATENT DOCUMENTS

WO    2016/010167 A1    1/2016

OTHER PUBLICATIONS

International Search Report and Written Opinion dated Jun. 11, 2018 for PCT/EP2018/057080 filed on Mar. 20, 2018, 11 pages.

*Primary Examiner* — Dung Hong
(74) *Attorney, Agent, or Firm* — BakerHostetler (57) ABSTRACT

A method including: establishing a first set of radio resources available for use by a terminal device for transmitting uplink data to a first network access node; establishing a shared set of radio resources available for use by the terminal device for transmitting uplink data to the first network access node and a second network access node; determining uplink data has become available for transmission; selecting radio resources to use for transmitting the uplink data from within the shared set of radio resources if it is determined the terminal device is in a boundary region between a first communication cell and a second communication cell; and selecting radio resources to use for transmitting the uplink data from within the first set of radio
(Continued)

resources if it is determined the terminal device is within the first communication cell and not in the boundary region.

14 Claims, 5 Drawing Sheets

(58) Field of Classification Search
CPC . H04W 72/04; H04W 72/0453; H04W 16/06; H04W 16/10; H04W 28/08; H04W 36/00
See application file for complete search history.

(56) References Cited

U.S. PATENT DOCUMENTS

| | | | |
|---|---|---|---|
| 2004/0005898 A1* | 1/2004 | Kato | H04W 36/06 455/450 |
| 2012/0075989 A1* | 3/2012 | Roessel | H04W 72/04 370/230 |
| 2012/0106472 A1* | 5/2012 | Rosa | H04L 5/0073 370/329 |
| 2012/0243431 A1* | 9/2012 | Chen | H04W 52/383 370/252 |
| 2013/0242776 A1* | 9/2013 | Kazmi | H04W 16/04 370/252 |
| 2016/0150432 A1* | 5/2016 | Qin | H04W 52/24 370/252 |
| 2016/0174257 A1* | 6/2016 | Webb | H04W 74/006 455/450 |
| 2017/0188314 A1* | 6/2017 | Mueck | H04W 24/02 |
| 2017/0201894 A1* | 7/2017 | Byun | H04W 16/32 |
| 2019/0191444 A1* | 6/2019 | Park | H04B 7/0626 |
| 2019/0296810 A1* | 9/2019 | Forenza | H04B 7/0434 |

\* cited by examiner

WIRELESS TELECOMMUNICATIONS APPARATUS AND METHODS

CROSS-REFERENCE TO RELATED APPLICATIONS

The present application is based on PCT filing PCT/EP2018/057080, filed Mar. 20, 2018, which claims priority to EP 17162411.7, filed Mar. 22, 2017, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles and data transfer requirements, for example in terms of latency and/or reliability targets.

One example use case currently considered to be of interest for next generation wireless communication systems includes so-called Ultra Reliable and Low Latency Communications (URLLC). See, for example, the 3GPP document RP-160671, "New SID Proposal: Study on New Radio Access Technology," NTT DOCOMO, RAN #71 [1].

URLLC services may be typically characterised as low latency services, for example aiming to transmit relatively small amounts of data through the radio network with a 1 ms packet transit time (i.e. so that each piece of URLLC data needs to be scheduled and transmitted across the physical layer in a time that is shorter than 1 ms) with high reliability, for example with a 99.999% reliability target. URLLC services may, for example, be applicable for safety-relevant communications, for example, communications relating to autonomous vehicle (driverless car) applications.

The inventors have recognized the desire to reliably support increasingly lower latency data transfer in wireless telecommunications systems gives rise to new challenges to be addressed to help optimise the operation of wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
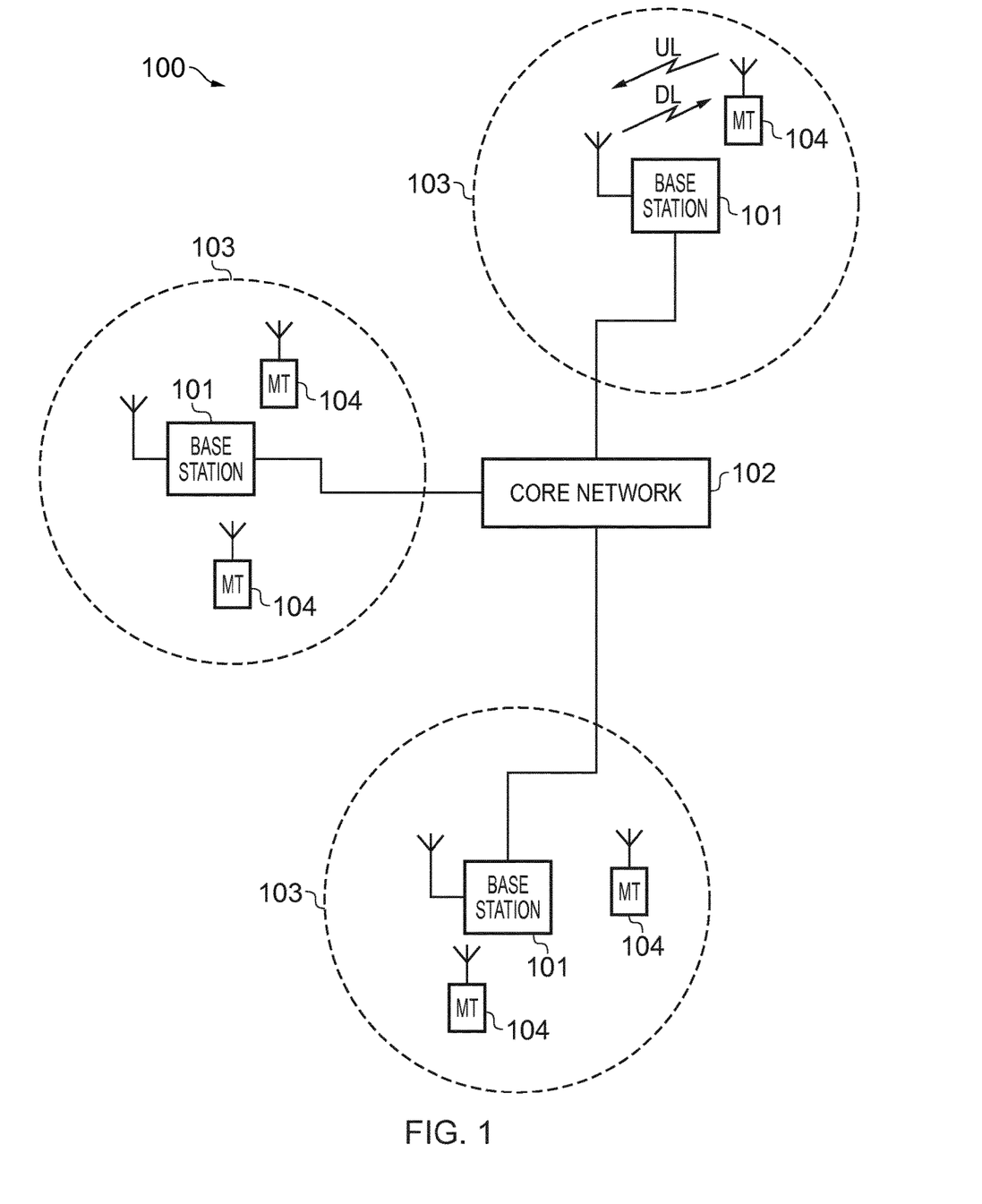
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity particular terminology may be used regardless of the underlying network architecture. That is to say, the use of a specific term in relation to certain example implementations is not intended to indicate these implementations are limited to a certain generation of network that may be most associated with that particular terminology.

Figure 2:
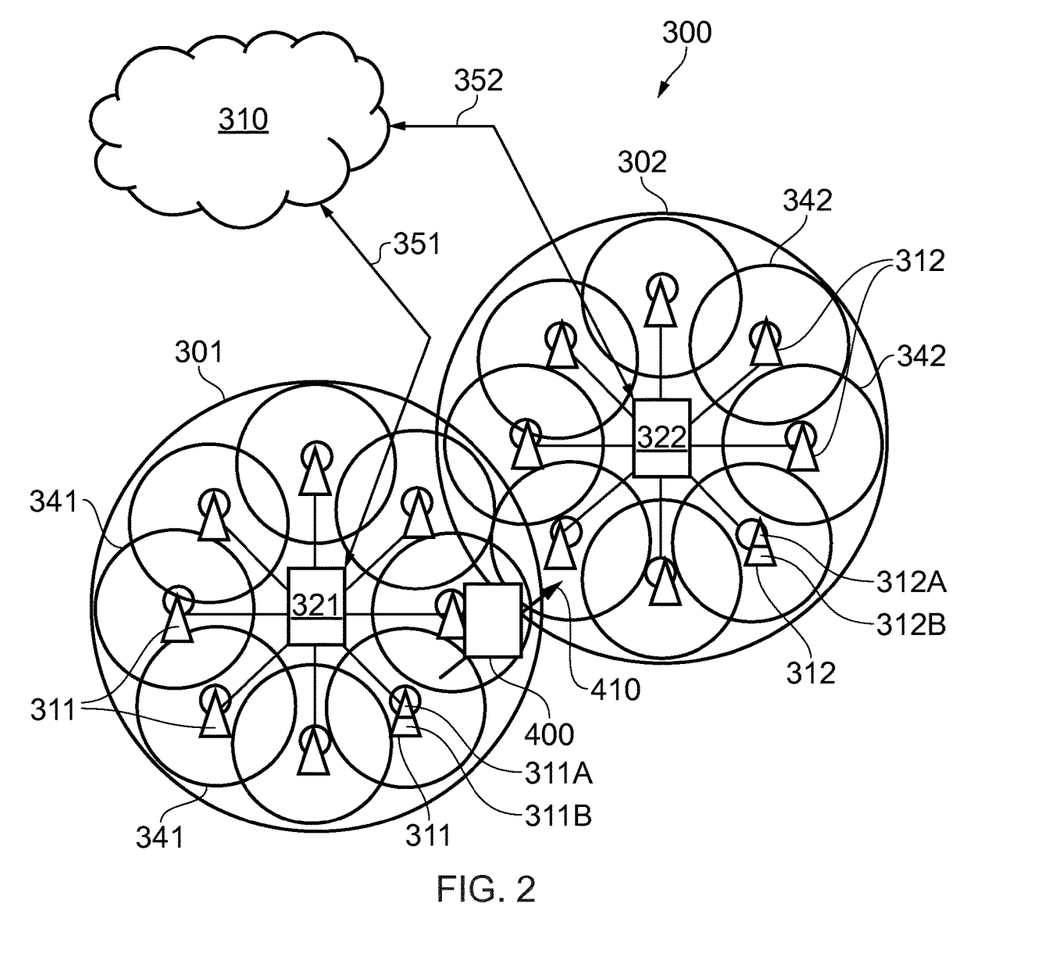
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

As discussed above, mobile communications networks such as the network 100 shown in FIG. 1 and the network 300 shown in FIG. 2 may support certain services for which low latency and high reliability are primary concerns (e.g. URLLC). For terminological convenience such services may sometimes be generally referred to herein as URLLC services, but it will be appreciated the principles and approaches described herein are not only applicable to specific URLLC services as currently proposed, but are generally applicable, in particular, but not exclusively, to services having the same characteristics as URLLC services in respect of a desire for low latency.

It has been proposed that uplink transmissions with relatively stringent latency requirements, such as for URLLC data, might in some situations be made using grant-free (non-allocated) radio resources. That is to say, a terminal device itself might autonomously select radio resources to use for transmitting an uplink data block, e.g. in terms of physical time and frequency resources, from among a predefined pool of available radio resources configured to support such grant-free transmissions. This is in contrast to the more common allocated/granted resources approach in which terminal devices receive resource allocation signalling (resource grants) from network infrastructure equipment to indicate the radio resources the terminal device should use for transmissions of uplink data to the network infrastructure equipment. An advantage of grant-free resource approaches is lower latency as a terminal device does not need to wait to receive an allocation of uplink radio resources to use before it can start transmitting data which has become available for uplink. A potential drawback with using grant-free resources is reduced efficiency in transmission resource usage because a pool of resources is set aside for grant-free access but is not always needed for use. To some extent this can be mitigated by configuring a relatively small pool of uplink resources for grant-free access, but that can lead to increased chance of conflict/collision because two terminal devices may autonomously select the same resources for making uplink transmission. An advantage of granted resource approaches is improved overall efficiency as the entity responsible for allocating resources can allocate resources as and when needed and does not need to reserve a pool of resource for certain types of data that may not always be needed. Some implementations may support both grant-free and granted resource approaches for uplink transmissions for certain types of data, such as URLLC data. For example, a regular predictable URLLC transmission might be made using allocated resources while an irregular unpredictable URLLC transmission might be made using grant-free resources.

The inventors have recognised there can be issues with using grant-free resources for uplink transmissions while a terminal device is in the vicinity of a boundary region between two communication cells, for example in situations of potential handover between radio network access nodes responsible for communicating with the terminal device in the two cells. In this regard it will be appreciated handovers may result from a device physically moving between coverage areas associated with different radio access nodes or from changing radio conditions associated with different cells for a static device, and the term mobility management may be used in relation to both scenarios.

In a handover procedure a terminal device is moved (handed over) from communicating with a first network access node (e.g. an LTE base station or 5G controlling unit) to communicating with a second network access node (e.g. another LTE base station or 5G controlling unit). The first network access node may be referred to as the source for the handover and the second network access node may be referred to as the target for the handover. A terminal device will typically be handed over from a source network access node to a target network access node because changing radio channel conditions mean the target network access node is better able to serve the terminal device than the source network access node, e.g. because the terminal device is moving. However, a handover may also be initiated for other reasons, for example for load balancing.

Many wireless telecommunications systems adopt a "break-before-make" approach to handovers. That is to say, the terminal device disconnects from the source network access node before connecting to the target network access node using a connection procedure. The inventors have recognised this can in some respects be detrimental for transmissions of delay-sensitive data (e.g. URLLC data). This is because there is a time window between when the terminal device disconnects from the source network access node and when the terminal device has completed its connection procedure with the target network access node in which the terminal device is unable to transmit uplink data. This means if data for uplink should become available in this time window, it may not be possible to transmit the data within a target latency threshold. It has been proposed to adopt a "make-before-break" approach to handovers to support URLLC services and other services having relatively stringent latency requirements. Proposals include conditional handover approaches (see, for example, "Conditional Handover", 3GPP TSG RAN WG2 Meeting #97, R2-1700864, Athens, Greece 13-17 Feb. 2017 [3]) and autonomous (network driven) handover approaches (see, for example, "NW controlled autonomous handover in single connectivity", 3GPP TSG RAN WG2 Meeting #97, R2-1701711, Athens, Greece 13-17 Feb. 2017 [4] and "Introduction of UE autonomous mobility", 3GPP TSG RAN WG2 Meeting #97, R2-1701360, Athens, Greece 13-17 Feb. 2017 [5]). In proposed conditional handover approaches a terminal device might only hand over to a target cell if a signal quality of the serving (source) cell is below a predefined threshold and a signal quality of the target cell is above a predefined threshold. A conditional handover can help prevent a terminal from handing over too early or too late into the target cell, which could cause ping-ponging or radio link failure between the target and serving cells.

Thus, with a "make-before-break" approach, a terminal device does not lose the ability to transmit uplink data during a handover, but instead may be simultaneously connected to two network access nodes during the handover procedure. Downlink data for the terminal device during the handover procedure may thus be routed from the core network to the terminal device via both network access nodes and the terminal device may thus receive the data via one or other, or both, network access nodes. If the terminal device successfully receives the data from both network access nodes, it may simply discard one copy of the data. Similarly, uplink data from the terminal device during the handover procedure may be transmitted to the core network via both network access nodes, which can help increase macro diversity. The core network may then discard one of the versions of the data or, with appropriate intercommunication between the two network access nodes, one network access node may instruct the other not to forward the data received from the terminal device to the core network if it is going to do so itself. In some cases, the uplink packets received by more than one network access node may be combined (e.g. via a selective combining procedure) with inter-communication between the network access nodes, or at a higher level of hierarchy than the network access nodes that support baseband and MAC processing. The combined packets may then be sent by one or other or both of the network access nodes to the core network.

Certain embodiments of the disclosure are directed to approaches for transmitting uplink data via two radio access nodes with improved efficiency (e.g. without requiring separate transmissions of the data from the terminal device to the respective network access nodes) while also helping retain flexibility in how different radio access nodes may configure radio resources within the respective communication cells they support.

Figure 3:
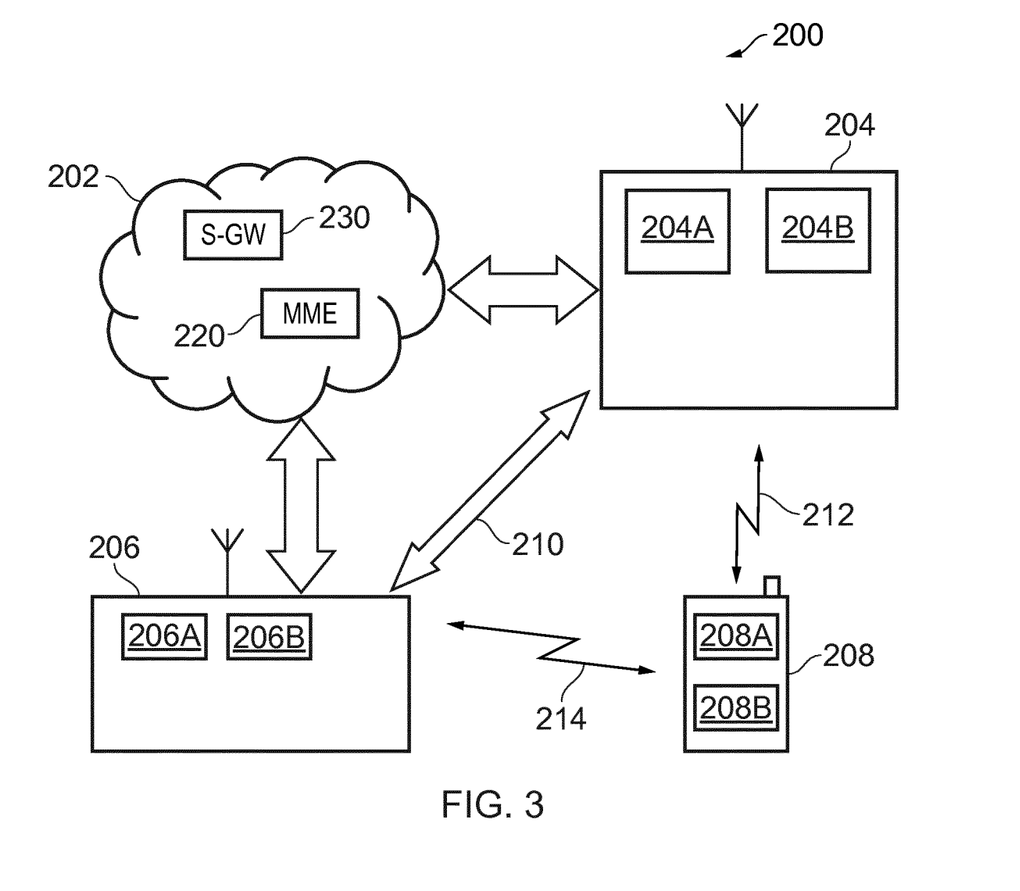
FIG. 3 schematically represents some aspects of a wireless telecommunication system in accordance with certain embodiments of the present disclosure.

FIG. 3 schematically represents some aspects of a wireless telecommunications system 200 configured to operate to support a terminal device 208 approaching a handover from a source network access node 204 to a target network access node 206 in accordance with certain embodiments of the disclosure. Aspects of the architecture and operation of the telecommunications system 200 which are not specifically described herein may be implemented in accordance with any previously proposed techniques, for example according to current 3GPP standards and other proposals for operating wireless telecommunications systems/networks. The network access nodes 204, 208 may, for convenience, sometimes be referred to herein as base stations 204, 208, it being understood this term is used for simplicity and is not intended to imply the network access nodes should conform to any specific network architecture, but on the contrary, these elements may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 200 comprises a core network part (evolved packet core) 202 coupled to a radio network part. The radio network part comprises the source network access node 204, the target network access node 206, and the terminal device 208. In this example, two network infrastructure elements 204, 206 and one terminal device 208 are shown for simplicity, but it will of course be appreciated that in practice the radio network part may comprise a larger number of base stations serving a larger number of terminal devices across various communication cells.

As with a conventional mobile radio network, the terminal device 208 is arranged to communicate data to and from the network access nodes (base stations/transceiver stations) 204, 206. Typically the terminal device will be connected to (i.e. able to exchange user plane data with) one network infrastructure element at a time. However, as noted above, a terminal device may in some cases be simultaneously connected to both the first and second network nodes, in particular when it is operating in a region where there is the potential for a handover to occur, i.e. when the terminal device is in a boundary region between the geographic footprints associated with the radio coverage (cells) of the respective network nodes. The network access nodes 204, 206 are communicatively connected to a serving gateway, S-GW, 230 in the core network part 202 which is arranged to perform routing and management of mobile communications services to the terminal devices in the telecommunications system 200 via the network access nodes 204, 206. In order to maintain mobility management and connectivity, the core network part 202 also includes a mobility management entity, MME, 220 which manages the enhanced packet service, EPS, connections with the terminal device 208 operating in the communications system based on subscriber information stored in a home subscriber server, HSS. Other network components in the core network in this example implementation (not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 3 may be broadly conventional apart from where modified to provide functionality in accordance with embodiments of the present disclosure as discussed herein.

The source network infrastructure element 204 comprises transceiver circuitry 204a (which may also be referred to as a transceiver/transceiver unit) for transmission and reception of wireless signals and processor circuitry 204b (which may also be referred to as a processor/processor unit) configured to control the source network infrastructure element 204 to operate in accordance with embodiments of the present disclosure as described herein. The processor circuitry 204b may comprise various sub-units for providing functionality in accordance with embodiments of the present disclosure as explained further herein. These sub-units may be implemented as discrete hardware elements or as appropriately configured functions of the processor circuitry. Thus, the processor circuitry 204b may comprise circuitry which is suitably configured/programmed to provide the desired functionality described herein using conventional programming/configuration techniques for equipment in wireless telecommunications systems. The transceiver circuitry 204a and the processor circuitry 204b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the source network infrastructure element 204 will in general comprise various other elements associated with its operating functionality, such as a scheduler. For example, although not shown in FIG. 3 for simplicity, the processor circuitry 204b may comprise scheduling circuitry, that is to say the processor circuitry 204b may be configured/programmed to provide the scheduling function for the source network infrastructure element 204.

The target network infrastructure element 206 comprises transceiver circuitry 206a (which may also be referred to as a transceiver/transceiver unit) for transmission and reception of wireless signals and processor circuitry 206b (which may also be referred to as a processor/processor unit) configured to control the target network infrastructure element 206 to operate in accordance with embodiments of the present disclosure as described herein. The processor circuitry 206b may comprise various sub-units for providing functionality in accordance with embodiments of the present disclosure as explained further herein. These sub-units may be implemented as discrete hardware elements or as appropriately configured functions of the processor circuitry. Thus, the processor circuitry 206b may comprise circuitry which is suitably configured/programmed to provide the desired functionality described herein using conventional programming/configuration techniques for equipment in wireless telecommunications systems. The transceiver circuitry 206a and the processor circuitry 206b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). For example, although not shown in FIG. 3 for simplicity, the processor circuitry 206b may comprise scheduling circuitry, that is to say the processor circuitry 206b may be configured/programmed to provide the scheduling function for the target network infrastructure element 206.

The terminal device 208 is adapted to support operations in accordance with embodiments of the present disclosure when communicating with the network access nodes 204, 206, and in particular when operating in a region when there is the potential for being handed off between them, as discussed further herein. The terminal device 208 comprises transceiver circuitry 208a (which may also be referred to as a transceiver/transceiver unit) for transmission and reception of wireless signals and processor circuitry 208b (which may also be referred to as a processor/processor unit) configured to control the terminal device 208. The processor circuitry 208b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 208b may comprise circuitry which is suitably configured/programmed to provide the desired functionality described herein using conventional programming/configuration techniques for equipment in wireless telecommunications systems. The transceiver circuitry 208a and the processor circuitry 208b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 208 will in general comprise various other elements associated with its operating functionality, for example a power source, user interface, and so forth, but these are not shown in FIG. 3 in the interests of simplicity.

Thus for the example implementation scenario represented in FIG. 3 it is assumed the terminal device 208 has been communicating with (connected to) the source network access node 204 over a radio path 212 and has moved to a location in which it may potentially be handed over to the target network access nodes 206, e.g. due to mobility, so that it may communicate with the target network access node over the radio path 214. The specific procedure for determining if the terminal device should in fact be handed over may be based on conventional techniques, for example taking account of radio channel conditions associated with the respective radio paths 212, 214 and/or load balancing. A communications link 210 between the network access nodes 204, 206 is provided so they may exchange information, for example to support a handover procedure. In some network architectures the network nodes may communicate directly with one another, as schematically represented in FIG. 3, while in other network architectures they may communicate with one another indirectly via the core network part 202.

To broadly summarise approaches in accordance with certain embodiments of the disclosure, a terminal device that is operating in a region where a handover from a first (source) network access node to a second (target) network access node might be expected to occur (i.e. when the terminal device is in radio coverage of two neighbouring radio access nodes), may be configured to transmit at least a certain type of uplink data (e.g. delay intolerant data, such as URLLC data) using grant-free resources that are selected from a pool of available grant-free resources, wherein the pool of available grant-free resources are configured for use by both the first and second network access nodes (i.e. both network access nodes are monitoring and able to receive uplink transmissions made using the shared pool of grant-free resources). Thus, the terminal device may undertake a single transmission of a data block using resources selected from this reserved set of grant-free resources that is shared by both network access nodes, and this transmission may be received by either, or both, of the network access nodes.

Put another way, in accordance with certain embodiments of the disclosure a wireless telecommunications system may be configured to include a shared grant-free resource pool that is common to at least two network access nodes, and in particular for a handover scenario, a shared grant-free resource pool that is common to at least a source network access node/cell and a target network access node/cell.

Uplink transmissions using resources selected by the terminal device from within the shared resource pool (shared set of transmission resources) may thus be received by both network access nodes.

A terminal device may be configured to use resources from within the shared grant-free resource pool in association with a handover procedure. For example, in an implementation that adopts a make-before-break approach to handover, the terminal device may be configured to use resources selected from within the shared grant-free resource pool during the time it is connected to both network access nodes (i.e. after it has connected to the target network access node, but before it has disconnected from the source network access node). In an implementation that adopts a break-before-make approach to handover, the terminal device may be configured to start using resources selected from within the shared grant-free resource pool when it is determined a handover may be imminent, for example based on changing radio channel conditions associated with a radio communications path between the terminal device and one or other, or both, of the source and target network access nodes. More generally, regardless of the approach to handover (i.e. whether make-before-break or break-before-make), the terminal device may be configured to use resources selected from within the shared pool of grant-free resources based on a determination as to whether the terminal device is in a boundary region between the communication cells supported by the source and target access nodes.

In this regard it will be appreciated the boundary region need not be a fixed and predefined geographical region (although in some implementations it may be), but rather the physical location of the boundary region between the communication cells may change as a function of relative radio channel conditions. For example, if radio channel conditions for communications with the target network node deteriorate compared to the radio channel conditions for communications with the source network node, the boundary region between the two cells supported by these nodes will, in effect, move towards the target network node. In some respects and for some example implementations, a determination as to whether or not the terminal device is in a boundary region between two communication cells may be broadly based on conventional techniques for determining when handover procedures/handover evaluation procedures should be initiated in a wireless telecommunications system. When the terminal device is not in the boundary region, it may instead select radio resources from respective pools of grant-free radio resources which are not shared between neighbouring network access nodes, but which are freely/independently configured for each network access node.

Thus, in accordance with certain embodiments of the disclosure different sets of radio resources may be configured (i.e. made available) for use by a terminal device for transmitting grant-free uplink resources in different situations. A first set of radio resources may be configured for use by the terminal device for transmitting grant-free uplink resources to the first network access node when the terminal device is connected to the first network access node (i.e. operating within a communication cell supported by the first network access node) and not in a boundary region between the first network access node and the second network access node (or more particularly between the communication cell supported by the respective network access nodes). A second set of radio resources may be configured for use by the terminal device for transmitting grant-free uplink resources to the second network access node when the terminal device is connected to the second network access node (i.e. operating within the communication cell supported by the second network access node), and not in a boundary region between the second network access node and the first network access node. A third, shared, set of radio resources may be configured for use by the terminal device for transmitting grant-free uplink resources to both the first and second network access nodes when the terminal device is in a boundary region between the first and second network access nodes (i.e. both network nodes monitor for uplink transmissions on these shared resources).

In some example implementations the first and second sets of radio resources may be independently configured by the respective first and second network nodes in accordance with the established principles for identifying resources to be reserved for a particular use in wireless telecommunications systems. The shared set of radio resources may be configured following signalling exchange between the two network nodes to agree the shared set of resources. For example, if the first network access node which wishes to configure or modify the shared set of radio resources, it may communicate a proposed set of radio resources to use for the shared set of radio resources to the second network access node. The second network access node may then reply with an indication of agreement or disagreement, for example based on whether or not the proposed set of radio resources are available for use for this purpose for the second network access node, or are needed by the second network access node for another purpose. If the second network access node does not wish to accept the proposal from the first network access node, it may reply with a counter proposal, or perhaps wait for the first network node to make another proposal. More generally, the specific manner in which the first and second network nodes may agree the shared set of resources is not of primary significance to the principles described herein. In some example implementations one or more of the respective sets of radio resources may be established from an operating standard for the wireless telecommunications system. In other examples, one or more of the respective sets of radio resources may be configured for each of the network access nodes at the time of their deployment or a subsequent update. In some cases the terminal devices may establish one or more of the respective sets of grant-free radio resource from signalling received from a network access node, for example an indication of the relevant resources may be conveyed to terminal devices operating in the wireless telecommunications network in accordance with conventional techniques for indicating resource availability, for example during a radio resource control, RRC, setup procedure. As noted elsewhere, in another example, the shared resources associated with each potential target network access node may be signalled as part of the neighbour cell information that is broadcast using system information.

Figure 4:
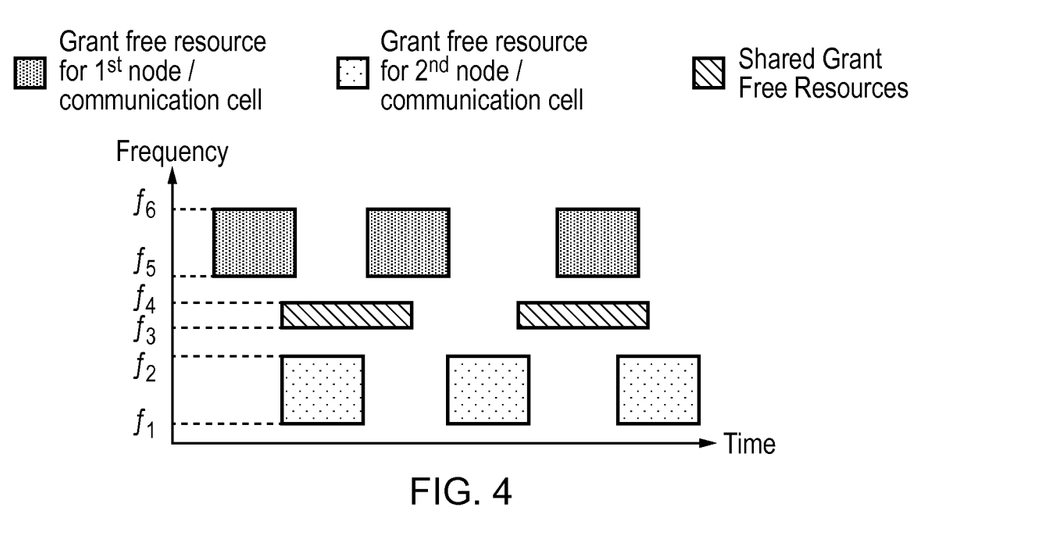
FIG. 4 schematically represents an arrangement in time and frequency of radio resources configured for grant-free uplink transmission from a terminal device to a first network access node, a second network access node, and both the first and second network access nodes.

FIG. 4 represents a schematic example of how first, second and third sets of radio resources may be arranged in time (horizontal axis) and frequency (vertical axis) in accordance with one example implementation of an embodiment of the disclosure. The radio resources made available for grant-free uplink data transmissions by a terminal device are schematically shown as shaded regions (in time and frequency) in the radio resource grid represented in FIG. 4. A terminal device wishing to transmit uplink data may do so by selecting resources from within the relevant set of radio resources. The resources may be selected from within the relevant set of radio resources in accordance with conventional techniques for selecting appropriate resources to use for grant-free uplink transmissions from within a predefined pool of resources.

In the example of FIG. 4, a first set of grant-free radio resources for communicating with the first network access node when the terminal device is connected to the first network access node and outside the boundary region between the first and second communication cells supported by the respective access nodes is shown with dark, non-hatched, shading. This set of radio resources is periodic in time on frequencies between f5 and f6.

A second set of grant-free radio resources for communicating with the second network access node when the terminal device is connected to the second network access node and is outside the boundary region between the first and second communication cells supported by the respective access nodes is shown with light, non-hatched, shading. This set of radio resources is periodic in time on frequencies between f1 and f2.

A third, shared, set of grant-free radio resources for simultaneously communicating with both the first and second network access nodes when the terminal device is inside the boundary region between the first and second communication cells supported by the respective access nodes is shown with hatched shading in FIG. 4. This set of radio resources is periodic in time on frequencies between f3 and f4. The terminal device may use this set of radio resources when it is determined it should be considered to be in the boundary region and regardless of whether it is connected to the first, the second, or both network access nodes (in the sense of having a radio resource, RRC, connection with the respective nodes).

It will be appreciated that FIG. 4 is intended to provide an indication of some of the principles that may be adopted when configuring the respective sets of radio resources for uplink communications in accordance with certain principles of the disclosure described herein, but the specific arrangement represented here is merely one example. Other examples may be based on different arrangements. For example one or more of the sets of radio resources may be continuous in time rather than periodic in some implementations (in particular, it may be considered that resources which are continuous in time may be particularly appropriate for uplink transmissions of data subject to the most stringent latency requirements). In some implementations the different sets of radio resources may be on the same frequency but time multiplexed or may occur at the same time but frequency multiplexed. In some cases there may be some degree of overlap between the different sets of radio resources and in some cases the radio resources associated with the different sets may be adjacent in frequency (and/or time) rather than spaced apart as schematically indicated in FIG. 4. In this regard, what is significant is not the specific arrangement, but rather that there are separate sets of radio resources that may be used for uplink transmissions according to whether a terminal device is connected to the first and second network access node, and furthermore there is another separate set of radio resources that may be selectively used for uplink transmissions when the terminal device is determined to be operating in a boundary region between the communication cells associated with the first and second network access nodes.

As noted above, in some implementations a terminal device may be instructed to begin using the grant-free resources which are shared by both the first and second network nodes as part of a handover procedure. For example in a make-before-break handover procedure, the terminal device might be configured to use the shared grant-free uplink resources for uplink data transmitted during the handover procedure. Also as noted above, there are various ways in which the set of shared resources made available/configured for grant-free access may be established by the terminal device. For example, the set of resources may be defined by reference to an operating standard for the network, or in signalling received by the terminal device from the first and/or second network access node.

For example, in some implementations, when a terminal device initially connects to the first network access node, the first network access node may indicate to the terminal device the shared resources to use when the terminal device determines it is in a boundary region for the communication cell associated with the first network access node.

In other examples, the configuration for the shared grant-free resource pool for uplink transmissions may be conveyed to the terminal device in association with signalling that instructs the terminal device to initiate a handover procedure, for example in a radio resource control, RRC, message. This may be an appropriate approach for implementations in which the shared grant-free resource pool may be reconfigured on a relatively frequent basis. In other examples, a terminal device that determines it should be classed as being in a boundary region may transmit a message to request an indication of the currently configured shared resource pool.

In some examples the terminal device may determine it is in a boundary region between cells supported by two network access nodes based on measurements of a characteristic indication of radio channel quality between the terminal device and the respective network access nodes, for example from measurements of reference signal received power, RSRP, or reference signal received quality, RSRQ, for downlink reference signals, or from other measurements of radio channel conditions (which may be based on uplink or downlink reference signalling).

For example, if the terminal device is connected to a first network access node (e.g. in the sense of having an RRC connection to the first network node), and determines the RSRP for the first network node has fallen below a predetermined threshold (which may be chosen, for example, having regard to the expected RSRP at cell edge for the network deployment at hand), the terminal device may determine it is in a boundary region (i.e. near cell edge) for the first network access node, and start using the shared resources for uplink data instead of the resources configured specifically for the first network access node.

Similarly, if the terminal device is connected to a first network access node and determines the RSRP for a neighbouring network node has risen above a predetermined threshold (which may be chosen, for example, having regard to the expected RSRP from neighbouring cells at cell edge for the network deployment at hand), the terminal device may determine it is in a boundary region (i.e. approaching coverage of the neighbouring cell), and start using the shared resources for uplink data instead of the resources configured specifically for the first network access node.

Furthermore, rather than rely on characteristics quality measurements from one or other of the neighbouring cells, the terminal device may rely on a difference between measurements of radio channel quality associated with the two cells. For example, if the terminal device is connected to a first network access node and determines the difference in RSRP between the first network access node and a neighbouring network access node has fallen below a predetermined threshold (which may be chosen, for example, having regard to the expected similarity in RSRP from neighbouring cells at their boundary for the network deployment at hand), the terminal device may determine it is in a boundary region, and start using the shared resources for uplink data instead of the resources configured specifically for the first network access node. In some cases an offset may be applied to the measurements of the cells to account for differences in transmit powers or propagation characteristics of the cells. For example, if one of the cells has a smaller radius and smaller transmit power than another cell, a positive offset can be applied to the RSRP of the smaller cell. This offset in effect biases the terminal device towards making uplink transmissions towards the small cell (to which there will be a lower path loss). It may also be noted that in some cases cell-specific resource pools and shared resource pools can be separately configured for uplink and downlink to account for different propagation characteristics and transmit power levels between the uplink and downlink.

Figure 5:
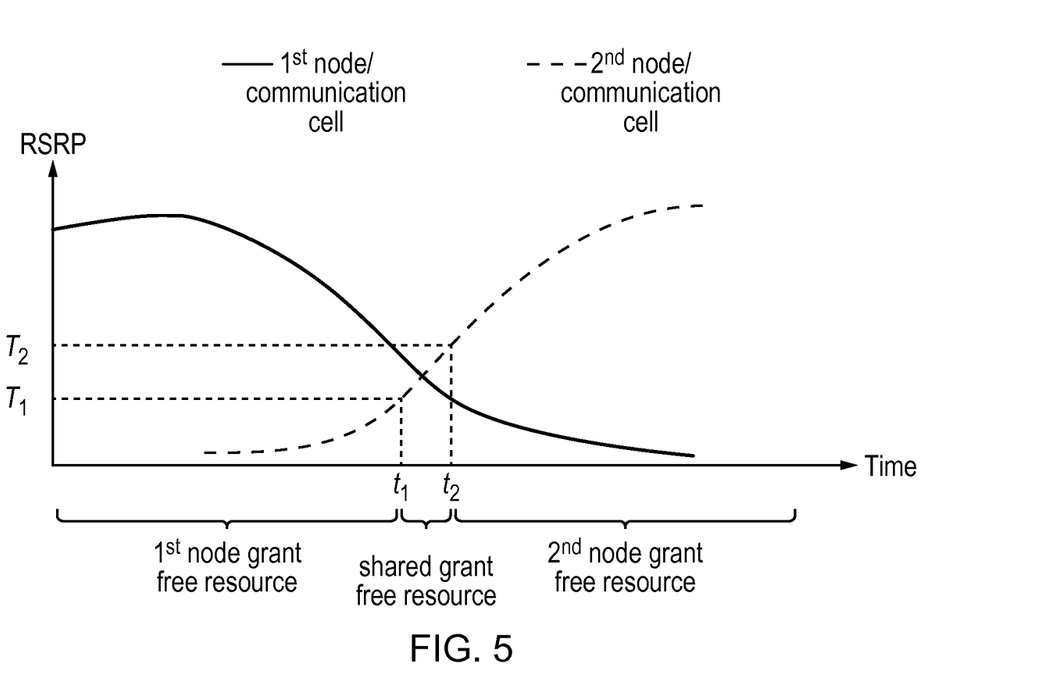
FIG. 5 is a graph schematically representing changes in reference signal received power, RSRP, measured by a terminal device for a first network access node and a second network access node as the terminal device is handed over from the first network access node to the second network access node.

An example of an approach based on measurements of a radio channel quality characteristic is schematically represented in FIG. 5. This is a plot schematically showing values of RSRP measured for a first network access node (solid line) associated with a first communication cell and a second network access node (dashed line) associated with a second communication cell as a function of time for a terminal device that moves from a central region within the first communications cell, across a boundary region between the first and second communication cells, and on towards a central region within the second communication cell.

As represented in FIG. 5, the RSRP measurements associated with the first communication cell start relatively high but fall off as the terminal device moves further away from the central region of the first communication cell (i.e. away from the first network access node). Conversely, the RSRP measurements associated with the second communication cell start relatively low but increase as the terminal device moves closer towards the central region of the second communication cell (i.e. towards the second network access node).

In accordance with one example approach, the terminal device may be configured to detect when the RSRP for the neighbouring communication cell rises above a first threshold level, T1, which in FIG. 5 happens at time t1. The terminal device may use this as an indication the terminal device has moved into a boundary region between the first and second communication cells. Furthermore, the terminal device may be configured to detect when the RSRP rises above a second threshold level, T2, which in FIG. 5 happens at time t2, and may use this as an indication the terminal device has moved out of the boundary region between the first and second communication cells and into a central region of the second communication cell. Accordingly, before time t1 the terminal device may use resources selected from within the first set of radio resources configured for grant-free uplink data transmissions specifically for the first network access node. Between times t1 and t2 the terminal device may use resources selected from within the shared set of radio resources configured for grant-free uplink data transmissions for both the first and second network access node. After time t2, the terminal device may use resources selected from within the second set of radio resources configured for grant-free uplink data transmissions specifically for the second network access node.

It will be appreciated FIG. 5 provides merely one example approach, and, as noted above, in other approaches the times for switching between different sets of radio resources for uplink data transmissions (i.e. the determinations as to whether the terminal device is in the boundary region) may be based on the RSRP associated with the first communication cell, or differences between the RSRP associated with the first communication cell and the second communication cell. For example, with reference to FIG. 5, in another approach t1 may correspond with the time at which the RSRP for the first communication cell falls below T2 (or other threshold) and t2 may correspond with the time at which the RSRP for the first communication cell falls below T1 (or other threshold). Alternatively, again with reference to FIG. 5, in another approach t1 may correspond with the time the difference in RSRP for the two communication cell falls below a threshold T3 (which may, for example correspond with an amount corresponding to T2-T1) and t2 may correspond with the time at which this difference in RSRP increases above the threshold T3. An advantage of the "difference" approach is that it automatically deals with situations in which the terminal device might enter the boundary region from one communication cell and then leave the boundary region by returning to the same communication cell. However, it will be appreciated this situation can easily be accounted for in approaches which are not based on the difference in RSRP, for example by switching from using the shared resource pool when the RSRP for either communication cell increases above T2. In this case, whichever RSRP rises above T2 indicates the network access node the terminal device has moved towards from the boundary region, and hence which of the cell-specific pools of uplink resource for grant-free transmissions should be used after this time. While the example of FIG. 5 has focused on using RSRP, it will be appreciated similar principles can be adopted in respect of any other indications channel quality conditions.

In terms of how a handover procedure might apply in respect of FIG. 5, for a make-before-break approach, the terminal device may be configured to connect to the second network access node around time t1, and to disconnect from the first network access node around time t2. For a break-before-make approach, the terminal device may be configured to disconnect from the first network access node shortly after t1, so that it may connect to the second network access node before t2.

It will be appreciated that in addition to the threshold in signal quality (e.g. such as T1 and T2 in FIG. 5), a time hysteresis may also apply whereby the terminal device needs to meet the threshold criterion for at least a certain time before taking action, e.g. so a short transient/temporary increase in measured RSRP does not necessarily trigger a change in resources used.

One aspect that may be considered relevant in certain situations concerns the extent to which the first and second network access nodes operate with radio frame structures which are time synchronised with one another. If the two network access nodes are time synchronised, they can both receive data transmissions from the terminal device using the shared resources in a straightforward way. If the two network access nodes are not time synchronised, the transmissions on the shared resources may, for example, be made using a transmission scheme that does not rely on time synchronisation between the transmitting and receiving entities. For example, code division multiple access, CDMA, or other non-orthogonal multiple access scheme which does not rely on the arrival of signals within a specific period of time may be used. In another example in which the two network access nodes are not time synchronised, data transmissions on the shared grant-free resource may be configured to include a predefined preamble followed by the high-layer data to be transmitted. The preamble may thus allow the respective network access nodes to detect the higher-layer data (e.g. URLLC data) based on detection of the preamble, for example using a correlator algorithm.

In accordance with certain embodiments, before the terminal device stops transmitting on the shared resources and starts transmitting on cell-specific resources, for example cell-specific resources for the second network access node following handover from the first network access node, the terminal device may transmit uplink reference signalling that may be received by the second network access node to allow the second network access node to establish a timing advance for the terminal device. The second network access node may transmit an indication of the timing advance to the terminal device (either directly or via the first network access node). Thus, when the terminal device does switch to transmitting on the cell-specific resources for the second network access node, it can do so using an appropriate timing advance, which can help facilitate a smooth transition from using the shared pool of grant free resource to using the pool of grant free resources specific to the second network access node. The uplink reference signalling transmitted by the terminal device to help establish a timing advance may be broadly conventional, for example it may comprise a predefined sequence transmitted on a physical random access channel for the second network access node or an uplink sounding reference signal, SRS, transmitted on predefined time and frequency resources. It will be appreciated that other characteristics/aspects of the terminal device's transmissions towards the second network access node can be determined in addition to, or instead of the timing advance and that indications of these characteristics can be additionally/alternatively signalled to the terminal device. Example other characteristics include a power level for the terminal device's transmissions and a frequency correction factor to be applied to the terminal device's transmissions.

Figure 6:
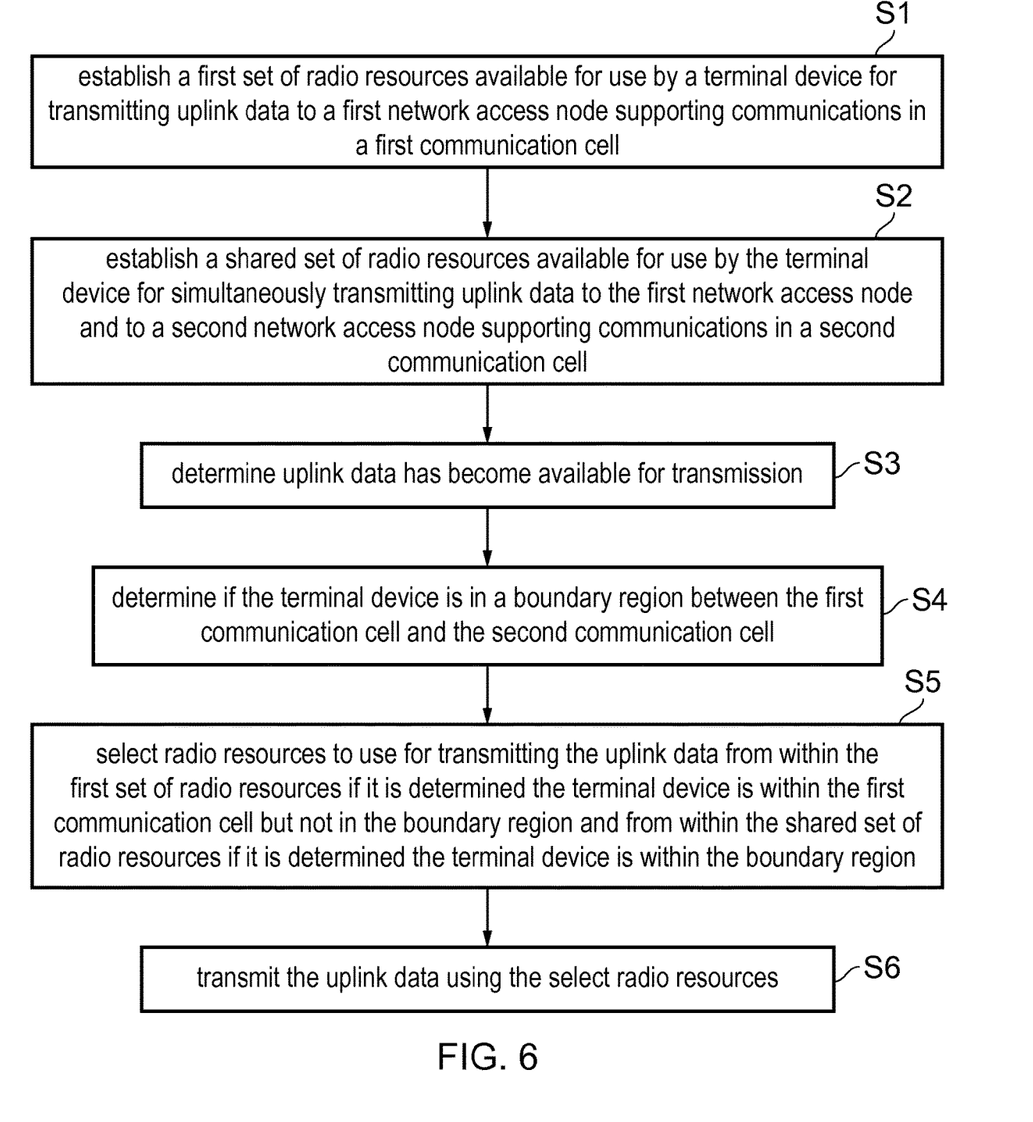
FIG. 6 is a flow diagram schematically representing some aspects of operation in a wireless telecommunications system in accordance with certain embodiments of the present disclosure.

Thus to summarise some of the above described approaches, FIG. 6 is a flow diagram schematically representing some aspects of operations in a wireless telecommunications system in accordance with certain embodiments of the present disclosure.

In step S1, the terminal device establishes a first set of radio resources available for use for transmitting uplink data to a first network access node supporting communications in a first communication cell.

In step S2, the terminal device establishes a shared set of radio resources available for use for simultaneously transmitting uplink data to the first network access node and to a second network access node supporting communications in a second communication cell.

In step S3, the terminal device determines that uplink data has become available for transmission.

In step S4, the terminal device determines if it is considered to be in a boundary region between the first communication cell and the second communication cell.

In step S5, the terminal device selects radio resources to use for transmitting the uplink data from within the first set of radio resources if it is determined the terminal device is within the first communication cell but not in the boundary region and from within the shared set of radio resources if it is determined the terminal device is within the boundary region.

In step S6, the terminal device transmits the uplink data using the select radio resources.

The respective network nodes are configured to monitor the shared resources for uplink transmissions from the terminal device.

It will be appreciated the above-described examples have focused on a scenarios in which a terminal device determined to be operating in a boundary region between a first communication cell and a second communication cell may switch to using a set of resources reserved for uplink grant-free access which is shared by the first and second communication cell. In the more general case, each communication cell will be adjacent a plurality of other communication cells, that is to say, in addition to the first and second communication cells, there may also be a third communication cell (and other communication cells) which also have boundaries with the first and/or second communication cells. Similar principles to those set out above can be adopted in relation to all boundary regions between different cells. In some implementations the same shared set of resources may be common for all boundary regions in an area of a network containing more than two communication cells. For example, a first communication cell may have boundaries with second, third and fourth communication cells, and the same set of shared resources may be configured for use in each boundary region. In other examples, different boundary regions may be associated with different shared resources. For example, a first communication cell may have boundary with second, third and fourth communication cells, and each boundary may be associated with a different shared set of resources. In situations where different boundaries are associated with different sets of shared resources, a network access node to which a terminal device is currently connected may provide the terminal device with an indication of the different shared resource configurations for the different boundaries, for example in association with neighbour cell information transmitted by the first network access node. Thus if the terminal device determines it is at a boundary region between two communication cells (e.g. because it has been instructed to undertake a handover procedure, or based on its on measurements of radio channel conditions), the terminal device can determine the appropriate shared resources on which it may make grant-free uplink transmissions for the relevant boundary.

It will be a appreciated the reason why data has become available for uplink transmission, and the information content of the data, is not significant to the principles described herein. Furthermore, it will be appreciated the above-described approach for transmitting uplink data on radio resources selected from a set of radio resources which is shared by neighbouring cells may be applied in respect of all data the terminal device wishes to uplink when it is in the vicinity of a cell boundary, or only certain types of data, for example data classified as requiring low latency transmission.

It will further be appreciated there are various different ways in which a terminal device may determine that it should be classed as being in a boundary region (and hence start using the shared resources). For example, rather than rely on measurements of radio channel conditions, or instructions received from a network node, the terminal device may be configured to determine its geographic position, for example based on a satellite navigation receiver system or standing signals received from network nodes, and then check if the terminal position falls within the predefined geographic extent of a boundary region.

Thus there has been described a method of transmitting uplink data in a wireless telecommunications system comprising a terminal device, a first network access node supporting wireless communications in a first communication cell and a second network access node supporting wireless communications in a second communication cell; wherein the method comprises: establishing a first set of radio resources available for use by the terminal device for transmitting uplink data to the first network access node; establishing a shared set of radio resources available for use by the terminal device for transmitting uplink data to the first network access node and to the second network access node, wherein the first set of radio resources and the shared set of radio resources are different sets of radio resources; determining uplink data has become available for transmission; selecting radio resources to use for transmitting the uplink data from within the shared set of radio resources if it is determined the terminal device should be considered to be is in a boundary region between the first communication cell and the second communication cell; and selecting radio resources to use for transmitting the uplink data from within the first set of radio resources if it is determined the terminal device is within the first communication cell should be considered to not be in the boundary region between the first communication cell and the second communication cell.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not significance to the principles of operation described herein.

Respective features of the present disclosure are defined by the following numbered paragraphs:

Paragraph 1. A method of transmitting uplink data in a wireless telecommunications system comprising a terminal device, a first network access node supporting communications in a first communication cell and a second network access node supporting communications in a second communication cell; wherein the method comprises: establishing a first set of radio resources available for use by the terminal device for transmitting uplink data to the first network access node; establishing a shared set of radio resources available for use by the terminal device for transmitting uplink data to the first network access node and to the second network access node, wherein the first set of radio resources and the shared set of radio resources are different sets of radio resources; determining uplink data has become available for transmission; selecting radio resources to use for transmitting the uplink data from within the shared set of radio resources if it is determined the terminal device is in a boundary region between the first communication cell and the second communication cell; and selecting radio resources to use for transmitting the uplink data from within the first set of radio resources if it is determined the terminal device is within the first communication cell and not in the boundary region between the first communication cell and the second communication cell.

Paragraph 2. The method of paragraph 1, further comprising: establishing a second set of radio resources available for use by the terminal device for transmitting uplink data to the second network access node, wherein the second set of radio resources and the shared set of radio resources are different sets of radio resources; and selecting radio resources to use for transmitting the uplink data from within the second set of radio resources if it is determined the terminal device is within the second communication cell and not in the boundary region between the first communication cell and the second communication cell.

Paragraph 3. The method of paragraph 1, wherein the shared set of radio resources is established by the terminal device from information transmitted by the first network access node.

Paragraph 4. The method of any of paragraphs 1 to 3, wherein the step of establishing the shared set of radio resources is performed in association with a handover procedure for handing over the terminal device from the first network access node to the second network access node.

Paragraph 5. The method of paragraph 4, wherein the handover procedure is a make-before-break handover procedure in which the terminal device establishes a radio connection with the second network access node before the terminal device releases a radio connection with the first network access node.

Paragraph 6. The method of any of paragraphs 1 to 5, further comprising the terminal device transmitting uplink reference signalling to allow the second network access node to establish a transmission characteristic to be used for subsequent transmissions from the terminal device to the second network access node, and receiving an indication of the transmission characteristic from the second network access node before being handed over to the second network access node.

Paragraph 7. The method of paragraph 6, wherein the transmission characteristic comprises at least one of an indication of a timing advance, an indication of a transmission power and/or an indication of a frequency correction.

Paragraph 8. The method of any of paragraphs 1 to 7, wherein the first network access node and the second network access node are time synchronised in respect of their respective radio frame structures for uplink data.

Paragraph 9. The method of any of paragraphs 1 to 8, further comprising transmitting the uplink data using the radio resources selected from within the shared set of radio resources using a transmission scheme that does not require time synchronisation between the terminal device and a receiving entity for the receiving entity to be able to receive the uplink data.

Paragraph 10. The method of paragraph 9, wherein the transmission scheme comprises a code division multiple access, CDMA, scheme.

Paragraph 11. The method of any of paragraphs 1 to 10, wherein measurements of a characteristic of radio channel quality between the terminal device and at least one of the first network access node and the second network access node are used to determine whether the terminal device is in the boundary region.

Paragraph 12. The method of paragraph 11, wherein the terminal device is considered to be in the boundary region if: (i) the measurements of the characteristic of radio channel quality indicate the radio channel quality between the terminal device and the first network access node is below a first predefined threshold level while the terminal device is in the first communication cell, and/or (ii) the measurements of the characteristic of radio channel quality indicate the radio channel quality between the terminal device and the second network access node is above a second predefined threshold level while the terminal device is in the first communication cell, and/or (iii) wherein the measurements of the characteristic of radio channel quality indicate the difference in radio channel quality between the terminal device and the first network access node and between the terminal device and the second network access node is below a third predefined threshold level.

Paragraph 13. A terminal device for use in a wireless telecommunications system comprising the terminal device, a first network access node supporting communications in a first communication cell and a second network access node supporting communications in a second communication cell; wherein the terminal device comprises controller circuitry and transceiver circuitry configured to operate together such that the terminal device is operable to: establish a first set of radio resources available for use by the terminal device for transmitting uplink data to the first network access node; establish a shared set of radio resources available for use by the terminal device for transmitting uplink data to the first network access node and to the second network access node, wherein the first set of radio resources and the shared set of radio resources are different sets of radio resources; determine uplink data has become available for transmission; select radio resources to use for transmitting the uplink data from within the shared set of radio resources if it is determined the terminal device is in a boundary region between the first communication cell and the second communication cell; and select radio resources to use for transmitting the uplink data from within the first set of radio resources if it is determined the terminal device is within the first communication cell and not in the boundary region between the first communication cell and the second communication cell.

Paragraph 14. Circuitry for terminal device for use in a wireless telecommunications system comprising the terminal device, a first network access node supporting communications in a first communication cell and a second network access node supporting communications in a second communication cell; wherein the circuitry comprises controller circuitry and transceiver circuitry configured to operate together such that the circuitry is operable to: establish a first set of radio resources available for use by the terminal device for transmitting uplink data to the first network access node; establish a shared set of radio resources available for use by the terminal device for transmitting uplink data to the first network access node and to the second network access node, wherein the first set of radio resources and the shared set of radio resources are different sets of radio resources; determine uplink data has become available for transmission; select radio resources to use for transmitting the uplink data from within the shared set of radio resources if it is determined the terminal device is in a boundary region between the first communication cell and the second communication cell; and select radio resources to use for transmitting the uplink data from within the first set of radio resources if it is determined the terminal device is within the first communication cell and not in the boundary region between the first communication cell and the second communication cell.

Paragraph 15. A method of operating a first network access node supporting communications in a first communication cell in a wireless telecommunications system comprising a terminal device, the first network access node and a second network access node supporting communications in a second communication cell; wherein the method comprises: establishing a first set of radio resources available for use by the terminal device for transmitting uplink data to the first network access node; establishing a shared set of radio resources available for use by the terminal device for transmitting uplink data to the first network access node and to the second network access node, wherein the first set of radio resources and the shared set of radio resources are different sets of radio resources; monitoring radio resources from within the shared set of radio resources for uplink data transmitted by the terminal device when the terminal device is in a boundary region between the first communication cell and the second communication cell; and monitoring radio resources from within the first set of radio resources for uplink data transmitted by the terminal device when the first terminal device is within the first communication cell and not in the boundary region between the first communication cell and the second communication cell.

Paragraph 16. A first network access node supporting communications in a first communication cell in a wireless telecommunications system comprising a terminal device, the first network access node and a second network access node supporting communications in a second communication cell, wherein the first network access node comprises controller circuitry and transceiver circuitry configured to operate together such that the first network access node is operable to: establish a first set of radio resources available for use by the terminal device for transmitting uplink data to the first network access node; establish a shared set of radio resources available for use by the terminal device for transmitting uplink data to the first network access node and to the second network access node, wherein the first set of radio resources and the shared set of radio resources are different sets of radio resources; monitor radio resources from within the shared set of radio resources for uplink data transmitted by the terminal device when the terminal device is in a boundary region between the first communication cell and the second communication cell; and monitor radio resources from within the first set of radio resources for uplink data transmitted by the terminal device when the first terminal device is within the first communication cell and not in the boundary region between the first communication cell and the second communication cell.

Paragraph 17. Circuitry for a first network access node supporting communications in a first communication cell in a wireless telecommunications system comprising a terminal device, the first network access node and a second network access node supporting communications in a second communication cell, wherein the circuitry comprises controller circuitry and transceiver circuitry configured to operate together such that the circuitry is operable to:

establish a first set of radio resources available for use by the terminal device for transmitting uplink data to the first network access node; establish a shared set of radio resources available for use by the terminal device for transmitting uplink data to the first network access node and to the second network access node, wherein the first set of radio resources and the shared set of radio resources are different sets of radio resources; monitor radio resources from within the shared set of radio resources for uplink data transmitted by the terminal device when the terminal device is in a boundary region between the first communication cell and the second communication cell; and monitor radio resources from within the first set of radio resources for uplink data transmitted by the terminal device when the first terminal device is within the first communication cell and not in the boundary region between the first communication cell and the second communication cell.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP document RP-160671, "New SID Proposal: Study on New Radio Access Technology," NTT DOCOMO, RAN #71, Gothenburg, Sweden, 7 to 10. March, 2016.
[2] Holma H. and Toskala A, "LTE for UMTS OFDMA and SC-FDMA based radio access", John Wiley and Sons, 2009.
[3] "Conditional Handover", 3GPP TSG RAN WG2 Meeting #97, R2-1700864, Athens, Greece 13-17 Feb. 2017.
[4] "NW controlled autonomous handover in single connectivity", 3GPP TSG RAN WG2 Meeting #97, R2-1701711, Athens, Greece 13-17 Feb. 2017.
[5] "Introduction of UE autonomous mobility", 3GPP TSG RAN WG2 Meeting #97, R2-1701360, Athens, Greece 13-17 Feb. 2017.

What is claimed is:

1. A method of transmitting uplink data in a wireless telecommunications system comprising a terminal device, a first network access node supporting communications in a first communication cell and a second network access node supporting communications in a second communication cell; wherein the method comprises:
   establishing a first set of radio resources available for use by the terminal device for transmitting uplink data to the first network access node;
   establishing a shared set of radio resources available for use by the terminal device for transmitting uplink data to the first network access node and to the second network access node, wherein the first set of radio resources and the shared set of radio resources are different sets of radio resources;
   determining uplink data has become available for transmission;
   selecting radio resources to use for transmitting the uplink data from within the shared set of radio resources if it is determined the terminal device is in a boundary region between the first communication cell and the second communication cell; and
   selecting radio resources to use for transmitting the uplink data from within the first set of radio resources if it is determined the terminal device is within the first communication cell and not in the boundary region between the first communication cell and the second communication cell.

2. The method of claim 1, further comprising:
   establishing a second set of radio resources available for use by the terminal device for transmitting uplink data to the second network access node, wherein the second set of radio resources and the shared set of radio resources are different sets of radio resources; and
   selecting radio resources to use for transmitting the uplink data from within the second set of radio resources if it is determined the terminal device is within the second communication cell and not in the boundary region between the first communication cell and the second communication cell.

3. The method of claim 1, wherein the shared set of radio resources is established by the terminal device from information transmitted by the first network access node.

4. The method of claim 1, wherein the step of establishing the shared set of radio resources is performed in association with a handover procedure for handing over the terminal device from the first network access node to the second network access node.

5. The method of claim 4, wherein the handover procedure is a make-before-break handover procedure in which the terminal device establishes a radio connection with the second network access node before the terminal device releases a radio connection with the first network access node.

6. The method of claim 1, further comprising the terminal device transmitting uplink reference signalling to allow the second network access node to establish a transmission characteristic to be used for subsequent transmissions from the terminal device to the second network access node, and receiving an indication of the transmission characteristic from the second network access node before being handed over to the second network access node.

7. The method of claim 6, wherein the transmission characteristic comprises at least one of an indication of a timing advance, an indication of a transmission power and/or an indication of a frequency correction.

8. The method of claim 1, wherein the first network access node and the second network access node are time synchronised in respect of their respective radio frame structures for uplink data.

9. The method of claim 1, further comprising transmitting the uplink data using the radio resources selected from within the shared set of radio resources using a transmission scheme that does not require time synchronisation between the terminal device and a receiving entity for the receiving entity to be able to receive the uplink data.

10. The method of claim 9, wherein the transmission scheme comprises a code division multiple access, CDMA, scheme.

11. The method of claim 1, wherein measurements of a characteristic of radio channel quality between the terminal device and at least one of the first network access node and the second network access node are used to determine whether the terminal device is in the boundary region.

12. The method of claim 11, wherein the terminal device is considered to be in the boundary region if: (i) the measurements of the characteristic of radio channel quality indicate the radio channel quality between the terminal device and the first network access node is below a first predefined threshold level while the terminal device is in the first communication cell, and/or (ii) the measurements of the characteristic of radio channel quality indicate the radio channel quality between the terminal device and the second network access node is above a second predefined threshold level while the terminal device is in the first communication cell, and/or (iii) wherein the measurements of the characteristic of radio channel quality indicate the difference in radio channel quality between the terminal device and the first network access node and between the terminal device and the second network access node is below a third predefined threshold level.

13. A terminal device for use in a wireless telecommunications system comprising the terminal device, a first network access node supporting communications in a first communication cell and a second network access node supporting communications in a second communication cell; wherein the terminal device comprises controller circuitry and transceiver circuitry configured to operate together such that the terminal device is operable to:
   establish a first set of radio resources available for use by the terminal device for transmitting uplink data to the first network access node;
   establish a shared set of radio resources available for use by the terminal device for transmitting uplink data to the first network access node and to the second network access node, wherein the first set of radio resources and the shared set of radio resources are different sets of radio resources;
   determine uplink data has become available for transmission;
   select radio resources to use for transmitting the uplink data from within the shared set of radio resources if it is determined the terminal device is in a boundary region between the first communication cell and the second communication cell; and
   select radio resources to use for transmitting the uplink data from within the first set of radio resources if it is determined the terminal device is within the first communication cell and not in the boundary region between the first communication cell and the second communication cell.

14. Circuitry for terminal device for use in a wireless telecommunications system comprising the terminal device, a first network access node supporting communications in a first communication cell and a second network access node supporting communications in a second communication cell; wherein the circuitry comprises controller circuitry and transceiver circuitry configured to operate together such that the circuitry is operable to:
   establish a first set of radio resources available for use by the terminal device for transmitting uplink data to the first network access node;
   establish a shared set of radio resources available for use by the terminal device for transmitting uplink data to the first network access node and to the second network access node, wherein the first set of radio resources and the shared set of radio resources are different sets of radio resources;
   determine uplink data has become available for transmission;
   select radio resources to use for transmitting the uplink data from within the shared set of radio resources if it is determined the terminal device is in a boundary region between the first communication cell and the second communication cell; and
   select radio resources to use for transmitting the uplink data from within the first set of radio resources if it is determined the terminal device is within the first communication cell and not in the boundary region between the first communication cell and the second communication cell.

* * * * *